United States Patent [19]

Shibanai et al.

[11] 4,048,359
[45] Sept. 13, 1977

[54] METHOD OF MANUFACTURING POLYCHROMATIC YARNS

[75] Inventors: Ichiro Shibanai, Tokyo; Shoji Tanabe, Kamakura, both of Japan

[73] Assignee: Japan Jewel Company Limited, Tokyo, Japan

[21] Appl. No.: 715,738

[22] Filed: Aug. 19, 1976

[30] Foreign Application Priority Data

Sept. 23, 1975   Japan ............................... 50-114319

[51] Int. Cl.$^2$ ................................................ B44F 1/00
[52] U.S. Cl. ........................................ 428/1; 156/219; 156/276; 156/257; 252/299; 252/408; 350/160 LC; 428/168; 428/372; 428/307; 428/913
[58] Field of Search ............... 156/250, 292, 257, 314, 156/276, 319, 269, 271, 219; 427/160, 203, 201, 407 C; 428/1, 372, 323, 913, 168, 307; 350/160 LC; 57/139, 153, 140R; 252/299, 316, 408 LC; 23/230 LC

[56] References Cited

U.S. PATENT DOCUMENTS

| 3,441,513 | 4/1969 | Woodmansee ..................... 252/299 |
| 3,620,889 | 11/1971 | Baltzer ............................. 428/913 |
| 3,666,587 | 5/1972 | Nagao ............................... 156/271 |
| 3,585,3381 | 6/1971 | Hodson et al. ................... 428/1 |

FOREIGN PATENT DOCUMENTS

1,409,206   10/1975   United Kingdom ................ 428/1

*Primary Examiner*—Charles E. Van Horn
*Assistant Examiner*—J. J. Gallagher
*Attorney, Agent, or Firm*—Frank J. Jordan

[57] ABSTRACT

A method of manufacturing polychromatic artificial yarns incorporating liquid crystals is provided.

According to this method, a transparent film sheet of plastic or other suitable material having a row of a plurality of longitudinally extending grooves on its outer surface is prepared and then coatings of microencapsulated liquid crystals, and particles of an ultraviolet light adsorbent are applied onto the grooves. After these processes, the entire outer surface of the film sheet is coated with a thin layer of carbon black and is then covered adhesively with another transparent film sheet of the same material. The entire material is finally cut out, across the second and first mentioned film sheets, longitudinally along the grooves to produce linear strips to be spun into yarns.

7 Claims, 2 Drawing Figures

METHOD OF MANUFACTURING POLYCHROMATIC YARNS

BACKGROUND OF THE INVENTION

The present invention relates to a method of manufacturing polychromatic yarns, and, more particularly, to a method of incorporation liquid crystals into fibers made of plastic or other suitable materials for spinning yarns.

Recently, the use of liquid crystals for various purposes has prevailed due to their unique property of scattering light of various colors according to temperature changes. For example, ornamental articles, temperature measuring devies, etc., utilizing liquid crystals has now become known. However, the manners of incorporation of the liquid crystals into these articles are more or less different from one another.

The present invention aims at providing a unique, novel and simple method of incorporating liquid crystals into artificial fibers or yarns by processing a transparent film sheet made of plastic or other suitable materials together with the use of an ultra-violet light adsorbing substance and carbon black for the protection and enhancement of the life-time and the function of the liquid crystals.

PRIOR ART

Heretofore, various attempts have been made to provide tasteful textile fabrics made of polychromatic yarns or fibers incorporating liquid crystals therein, with the observation of the above-mentioned color changing property thereof. And, as methods for incorporation of the liquid crystals, a mixture of liquid crystals and fine particles of an ultra-violet light adsorbent was filled within a cavity of a hollow artificial yarn or fiber, or a material liquid for producing fibers was blended, in advance, with the liquid crystals, or the fibers were immersed into the liquid crystals. However, it has been found that the use of only the liquid crystals and the ultra-violet light adsorbent is insufficient in that the tone of the colors of the liquid crystals is unclear and it is desirable to use carbon black additionally. However, the present inventors have found that, even with the use of this carbon black, all of the above-mentioned methods have such a drawback that the carbon black is liable to adhere to the liquid crystals almost all around and it is not possible to make it adhere only to one side of a layer of the liquid crystals.

SUMMARY OF THE INVENTION

To overcome the above-mentioned defects, the present invention provides a novel method of manufacturing polychromatic yarns or fibers, such that a film sheet of plastic or other suitable materials having a row of a plurality of longitudinally extending grooves on its outer surface is prepared and coatings of micro-encapsulated liquid crystals, and fine particles of an ultra-violet light adsorbent or of a mixture of two or more kinds of such substances are applied onto the grooves and the entire outer surface of the film sheet is coated with a thin layer of carbon black to be then covered with anoher thin film sheet of the same material. The entire material is finally cut out, across the second and first film sheets, longitudinally along the grooves into fiber-like linear strips for spinning yarns. Alternatively, the cut out strips may become yarns themselves.

Accordingly, an object of the present invention is to provide a method of manufacturing polychromatic artificial yarns incorporating microencapsulated liquid crystals.

Another object of the present invention is to provide a method of manufacturing polychromatic artificial yarns wherein an ultra-violet light adsorbing substance of a mixture of two or more kinds of such substances is additionally incorporated for prolonging the life time of the liquid crystals.

Further object of the present invention is to provide a method of manufacturing polychromatic artificial yarns wherein a coating of carbon black is additionally applied on the one side of a layer of the above-mentioned liquid crystals for enhancing the brightness of the tone of colors of the liquid crystals.

Still further object of the present invention is to provide a method of manufacturing polychromatic artificial yarns simply and economically.

DESCRIPTION OF PREFERRED EMBODIMENTS

The preferred embodiments of the present invention will now be described in detail with reference to the accompanying drawing.

Figure 1:
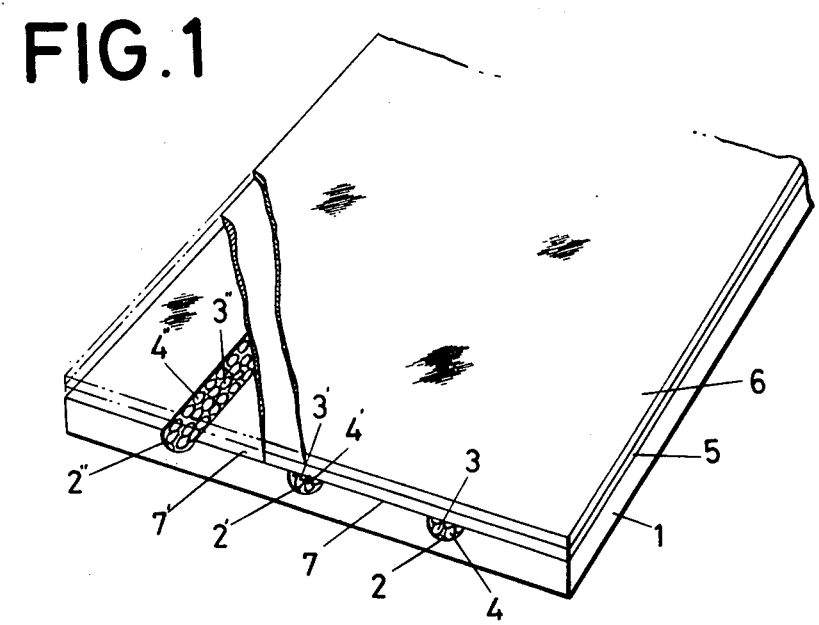
FIG. 1 is a diagrammatical view, partially broken away, of one form of a basic transparent plastic film sheet in the process of manufacturing polychromatic yarns according to the present invention, especially prior to cutting.
Figure 2:
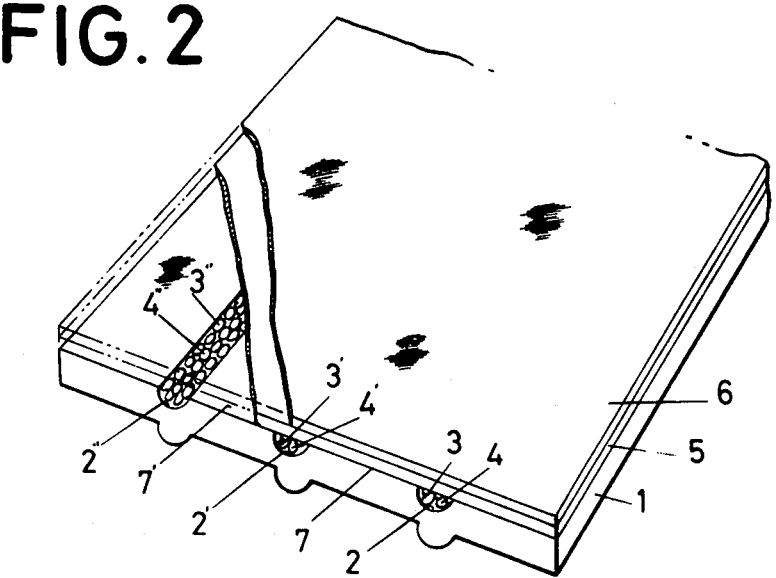
FIG. 2 is also a diagrammatical view, partially broken away, of another form of a transparent plastic film sheet in the same process as in FIG. 1.

Referring now to FIGS. 1 and 2, a transparent plastic film sheet 1 of about 80 microns in thickness is formed on its outer surface with a plurality of longitudinally extending semi-circular grooves 2, 2' of about 80 microns in diameter at certain intervals. Then an aggregation of micro-encapsulated liquid crystals 3, 3' each of which being about 10 microns in diameter and fine particles of an ultraviolet light adsorbent 4, 4' are coated onto the grooves 2, 2' for filling same. Further, the entire outer surface of the plastic film sheet 1 is subjected to a thin coating of carbon black 5 and then covered adhesively with another thin plastic film sheet 6 of below 20 microns and finally, the entire material is cut out, across the second and first mentioned film sheets, longitudinally along the grooves 2, 2' as at portions 7, 7' of the surface of the film sheet 6 to produce linear strips to be spun into yarns.

As methods of forming the grooves 2, 2' on the film sheet 1, the surface of the film sheet 1 may be so engraved as shown in FIG. 1 or may be so formed by compression at suitable portions thereof to form protrusions on the rear surface of the film sheet 1, as shown in FIG. 2.

Furthermore, the ultra-violet light adsorbent to be used in this invention is not necessarily limited to only a single material but many kinds of such materials may be used. For example, when a mixture of Fe(3) and Ce(4) ions is used for the purpose, ultra-violet light would be better adsorbed thereby and adverse effects on the liquid crystals would be prevented thereby to enhance and prolong the polychromatic or color varying function and the life-time of the liquid crystals.

As described above in detail, the polychromatic yarns manufactured by the method of the present invention have various advantages that since the liquid crystals incorporated therein scatter light of a variety of colors kaleidoscopically according to temperature changes such as in body heat, room temperature or in atmospheric temperature in every season, the tone of the colors becomes clear and bright due to the specific use of carbon black. Furthermore, the method of the present invention is quite simple and the yarns manufactured thereby have a wide range of industrial utility being available for application to various articles such as clothing, curtains, carpets, many kinds of accessories, decorations, embroidery yarns, etc.

Finally, it should be noted that although the present invention has been explained only in respect of its preferred embodiment various changes or modifications may be made possible within the scope and spirit of the present invention and all of these are to be covered by the present invention.

What is claimed is:

1. Polychromatic artificial yarns each comprising a transparent plastic film enclosure incorporating (1) a layer of micro-encapsulated liquid crystals mixed with an ultraviolet light adsorbent in fine particle form and (2) a layer of carbon black, and manufactured by the steps of:

forming a plurality of grooves on one surface of a first transparent thin plastic film in parallel and spaced apart relationship with one another;

applying a layer of micro-encapsulated liquid crystals mixed with an ultra-violet light adsorbent onto the surface of each of said grooves;

applying a layer of carbon black over said surface of said first transparent thin plastic film;

covering adhesively said surface of said first transparent thin plastic film with a second transparent thin plastic film;

cutting out said second and first transparent thin plastic films longitudinally between said grooves into linear strips each forming the film enclosure.

2. In a method of manufacturing polychromatic artificial yarns each comprising a transparent plastic film enclosure incorporating therein (1) a layer of micro-encapsulated liquid crystals mixed with an ultra-violet light adsorbent in fine particle form and (2) a layer of carbon black, the improvement characterized by the steps of:

forming a plurality of grooves on one surface of a first transparent thin plastic film in parallel and spaced apart relationship with one another;

applying a layer of micro-encapsulated liquid crystals mixed with an ultra-violet light adsorbent onto the surface of each of said grooves;

applying a layer of carbon black over said surface of said first transparent thin plastic film;

covering adhesively said surface of said first transparent thin plastic film with a second thinner transparent plastic film;

cutting out said second and first transparent plastic films longitudinally between said grooves into linear strips each forming the film enclosure.

3. The method of manufacturing polychromatic artificial yarns according to claim 2 wherein said ultra-violet light adsorbent comprises a mixture of Fe(3) and Ce(4) ions.

4. The method of manufacturing polychromatic artificial yarns according to claim 2 wherein each of said grooves is of semi-circular shape having a diameter of about 80 microns.

5. The method of manufacturing polychromatic artificial yarns according to claim 2 wherein the thickness of said first transparent plastic film is about 80 microns.

6. The method of manufacturing polychromatic artificial yarns according to claim 2 wherein the thickness of said second transparent plastic film is below 20 microns.

7. The method of manufacturing polychromatic artificial yarns according to claim 2 wherein the diameter of each said micro-encapsulated liquid crystals is about 10 microns.

* * * * *